Figure 11:
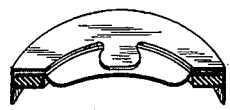

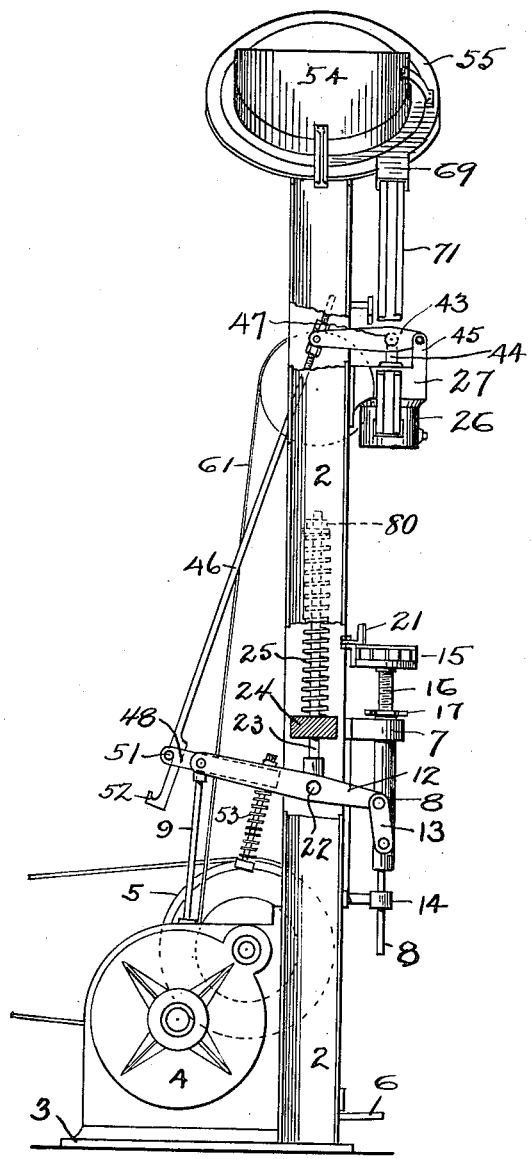
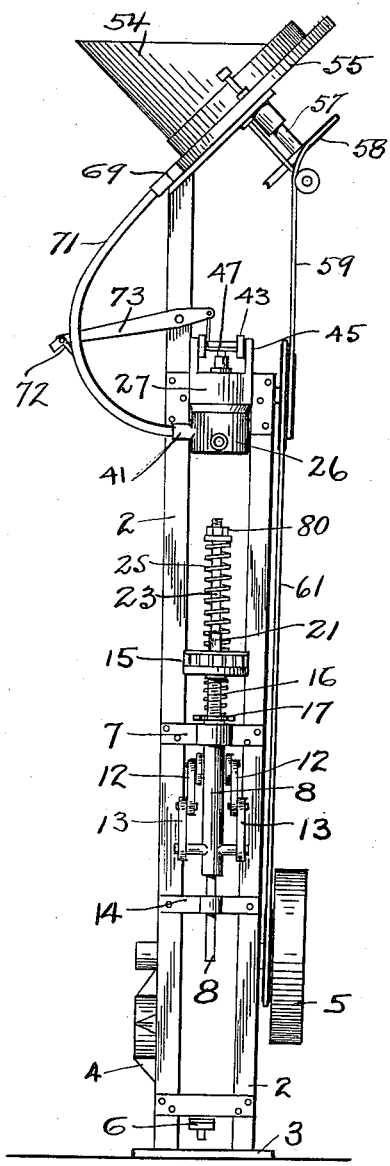

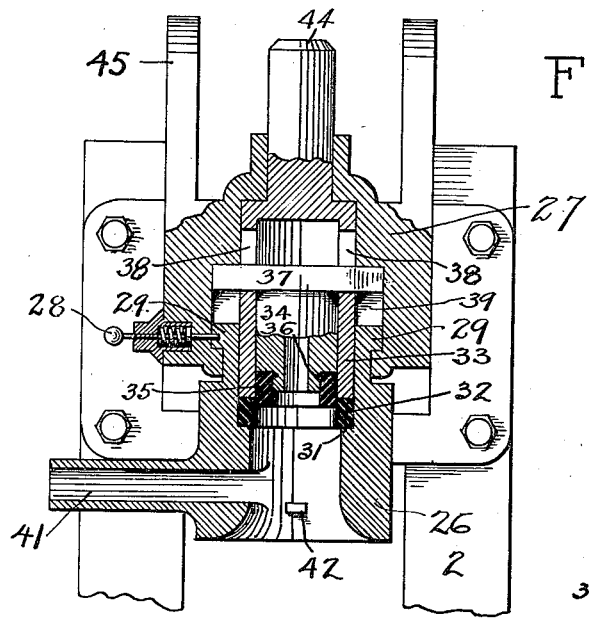
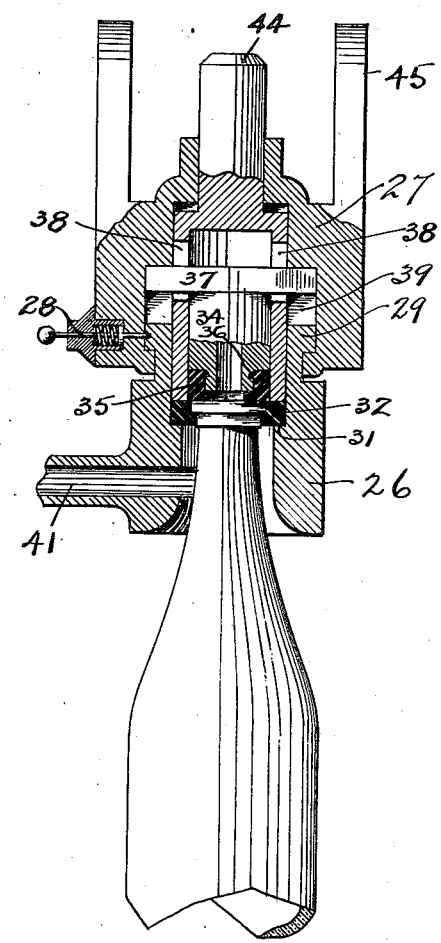
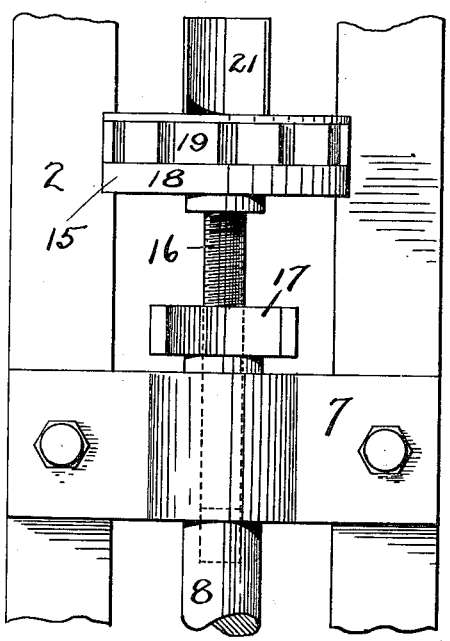

W. C. BUHLES.
CAPPING MACHINE.
APPLICATION FILED DEC. 1, 1911.
1,162,025.
Patented Nov. 30, 1915
5 SHEETS—SHEET 3.
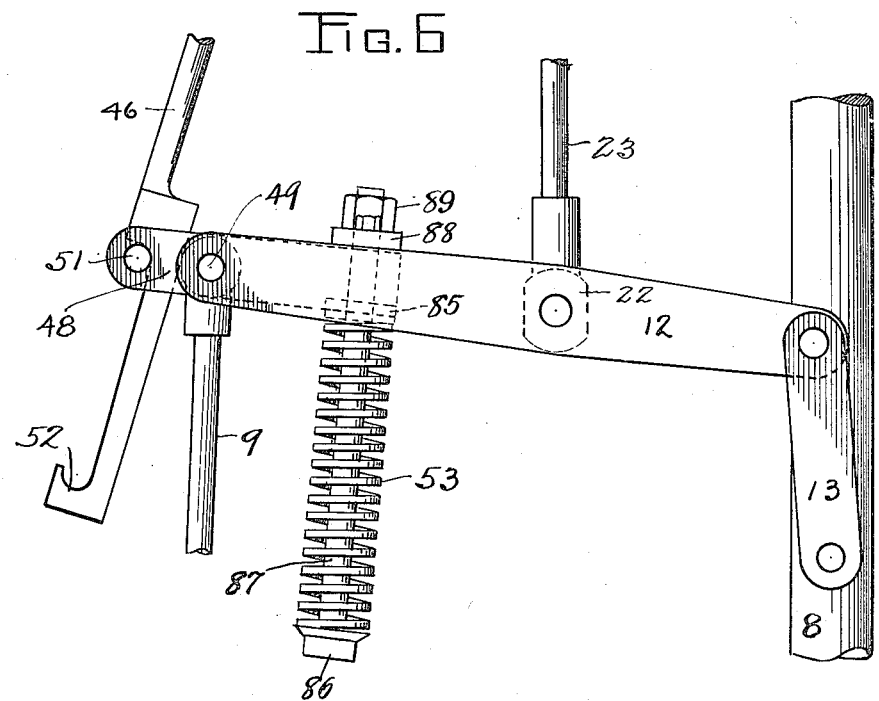
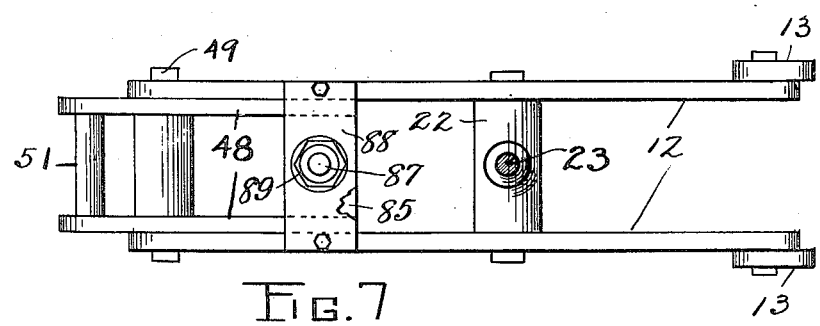
WITNESSES
INVENTOR
Wm. C. BUHLES.
BY
His ATTORNEYS W. C. BUHLES.
CAPPING MACHINE.
APPLICATION FILED DEC. 1, 1911.
1,162,025.
Patented Nov. 30, 1915.
5 SHEETS—SHEET 4.
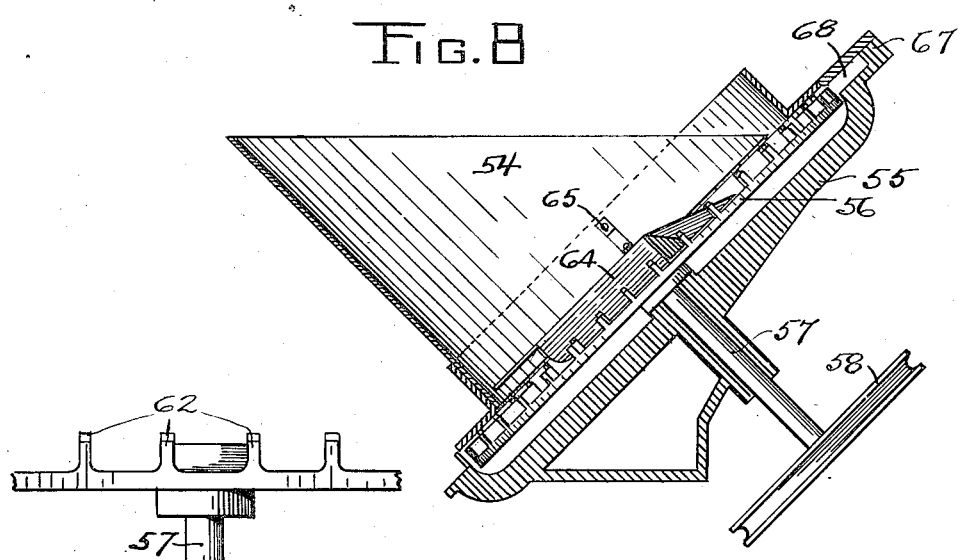
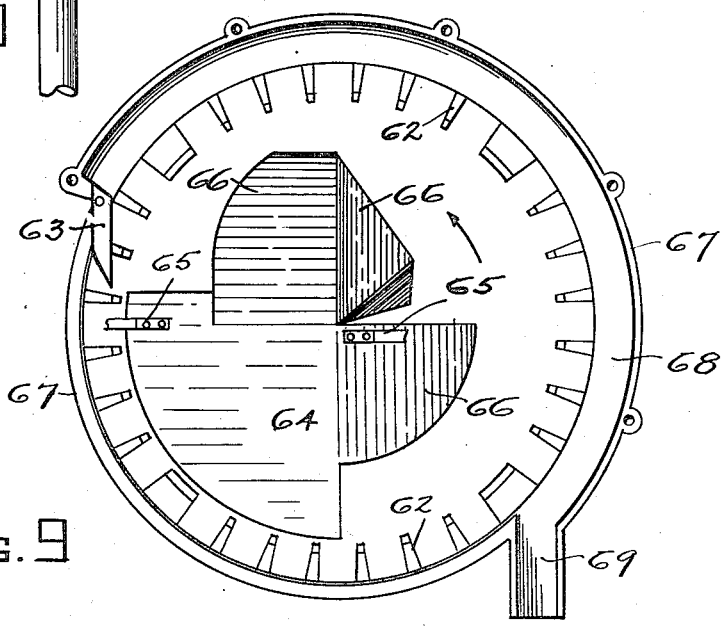
WITNESSES
INVENTOR
W<sup>m</sup>. C. BUHLES.
BY
His ATTORNEYS

W. C. BUHLES.
CAPPING MACHINE.
APPLICATION FILED DEC. 1, 1911.

1,162,025.

Patented Nov. 30, 1915.
5 SHEETS—SHEET 5.

WITNESSES
H. J. Prost.
H. A. Scholten

INVENTOR
Wm. C. BUHLES
BY Miller & White
his ATTORNEYS.

UNITED STATES PATENT OFFICE.

WILLIAM C. BUHLES, OF SAN FRANCISCO, CALIFORNIA, ASSIGNOR, BY MESNE ASSIGNMENTS, TO ALUMINUM SEAL COMPANY, A CORPORATION OF PENNSYLVANIA.

CAPPING-MACHINE.

1,162,025.

Specification of Letters Patent.

Patented Nov. 30, 1915.

Application filed December 1, 1911. Serial No. 663,321.

*To all whom it may concern:*

Be it known that I, WILLIAM C. BUHLES, a citizen of the United States, and a resident of the city and county of San Francisco and State of California, have invented certain new and useful Improvements in Capping-Machines, of which the following is a specification.

This invention relates to capping machines for securing caps or covers to bottles, jars and similar receptacles, and more especially to a machine for applying caps, to receptacles formed of vitreous material, or covers of a vitreous material to similar receptacles by means of retaining bands.

The object of the invention is to provide a machine for attaching caps or covers to receptacles of a vitreous nature, which operates in such manner that the liability of cracking or breaking of the receptacle or cover is reduced to a minimum.

Another object of the invention is to provide a capping machine in which the downward pressure on the cap or cover reaches a maximum before the side pressure is applied to secure the cap or retaining band to the receptacle.

Another object of the invention is to provide a capping machine in which the downward pressure on the cap or cover may be regulated independently of the "side" or inward pressure which serves to compress the flange of the cap or retaining band around the neck of the receptacle.

A further object of the invention is to provide an improved means for feeding the caps or retaining bands to a position to engage the receptacle.

The machine possesses other advantageous features, which, with the foregoing will be set forth at length in the following description, where I shall outline in full that form of embodiment of the invention which has been selected for illustration in the drawings accompanying and forming part of the present specification. The novelty of the invention will be included in the claims succeeding said description. From this it will be apparent that I do not restrict myself to the showing made by such drawings and descriptions, as I may adopt many variations within the scope of my invention as expressed in said claims.

Figure 12:
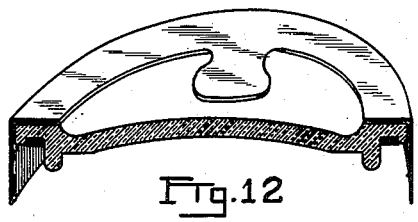
Figure 13:
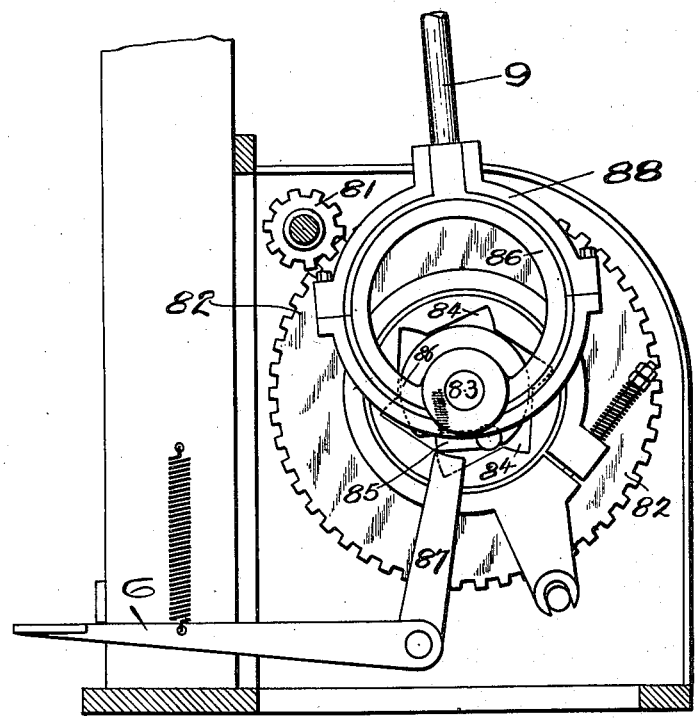

Referring to the drawings—Figure 1 is a front elevation of the complete machine; Fig. 2 is a side view of the machine, parts of the structure being broken away to disclose the operating parts; Fig. 3 is a vertical section through the head showing the parts in inoperative position; Fig. 4 is a detail showing the table upon which the receptacle rests; Fig. 5 is a vertical section through the head showing the parts in operative position; Fig. 6 is a detail showing the mechanism employed for regulating the downward and sidewise pressure, each independent of the other; Fig. 7 is a plan or top view of the detail shown in Fig. 6; Fig. 8 is a vertical section through the feed hopper, showing the construction thereof; Fig. 9 is a plan of part of the feeding apparatus showing the distributing plate and the agitating plate; Fig. 10 is a side view of a fragment of the distributing plate showing a cap in place thereon. Fig. 11 is a sectional perspective view of the metallic cap. Fig. 12 is a sectional perspective view of the glass cap and metallic ring. Fig. 13 is an elevation of the power transmitting mechanism in the base of the apparatus.

The machine consists of a frame 2 on which the various operating parts are arranged, and which is of suitable size and shape to support the various parts in their correct positions. The machine is provided with a base 3 by which it is attached to the floor and on this base 3 is arranged the casing 4 preferably formed integral therewith which incloses the driving gear. Machines embodying the invention may be operated manually or by power, that shown in the drawings being provided with a driving pulley 5 for a belt connection with a source of power.

Mounted on the shaft of the driving pulley 5 is a pinion 81 meshing with the gear 82 on shaft 83. The gear 82 is provided with an internal ratchet or series of teeth 84 which are adapted to be engaged by the spring pressed dog 85 pivotally attached to the eccentric 86, which is loosely mounted on shaft 83. A foot lever 6, extending beyond the frame of the machine, is provided with an arm 87 which operates, when the foot pedal is raised, to force the dog 85 out of engagement with the teeth 84, thereby halting the operation of the machine, which can only be accomplished at the end of a complete operation of the apparatus.

Supported on the frame by the bracket 7, and slidable vertically therein is a spindle 8 to which vertical movement is imparted from the driving mechanism through the connecting rod 9, the levers 12 and the links 13. The connecting rod 9 is secured at its lower end to the strap 88 surrounding the eccentric 86. The lower end of the spindle 8 is guided by bearing in the bracket 14 which is preferably formed integral with the bracket 7, the two parts being connected by a rib. Mounted on the spindle is the table 15 on which the receptacle rests during the capping operation. This table is adjustably arranged with regard to the spindle, so that it can be raised or lowered depending on the height of the receptacle to be capped. This adjustability may be accomplished in several ways, and in the drawings I have shown a screw threaded shank 16 fitting into the spindle 8 and locked in position by the nut 17 bearing against the upper surface of the spindle.

The table 15 is generally circular in shape and is formed of a metallic disk 18 upon which is fastened a cushion 19, formed preferably of rubber. This rubber cushion is generally formed of separate blocks of rubber, spaced apart so that it may readily yield when pressure is applied. On top of the rubber cushion is a flat plate generally formed of leather, on which the receptacle rests. Since the machine is designed especially for operating on bottles and jars of vitreous or fragile material, the cushion is interposed to relieve the receptacles from any sudden shocks and to distribute the pressure evenly over the bottom. The bottoms of the receptacles are often irregular, and if a rigid table were used, the pressure would concentrate at certain points of the bottom and break the receptacle. The table is also provided with a guide or backing member 21 which is adjustable radially of the table. This guide is adjusted for various sizes of receptacles, so that when the receptacle is placed on the table and against the guide, it is in central position on the table.

The levers 12, which operate to raise and lower the table are fulcrumed on the cross bar 22 which is supported by the rod 23. This rod 23 passes through the cross piece 24 in the frame and is in turn supported by the coiled spring 25 surrounding the rod and bearing against a nut 80 on its upper end and the cross piece.

Arranged on the frame, above the table 15 and in line therewith is the head 26 in which the caps or covers are secured to the receptacles. The head is supported in the bracket 27 which is rigidly attached to the frame and which projects from the frame a suitable distance to hold the head in the proper position. The head 26 is removably held in the bracket by a bayonet joint, and is prevented from rotating therein by the spring pin 28. The object of making the head removable is to allow the pressure rings to be readily changed, to remove mangled caps and to allow heads of various interior sizes to be used, so that the machine may be used on receptacles having openings of various sizes. Each size head is designed to be used with a cap or retaining band of a given diameter.

The head is made cylindrical in form and is provided with an opening extending vertically therein for receiving the cap and the neck of the receptacle. This opening flares outwardly at the bottom to allow a more ready insertion and centering of the receptacle neck. The upper part of the cylinder is provided with lugs 29 which engage with the bracket 27 in the form of a bayonet joint.

Arranged within the head are means which act during the operation of the machine to press or roll the flange of the cap or retaining band against the neck of the receptacle and into locking engagement therewith. This crimping or rolling means may be of any suitable construction, the preferred form being a ring of conformable material such as the india rubber ring 32, seated within the head upon a flange 31 and which is adapted to be distorted to press or crimp the flange of the cap against the bottle neck. In the preferred construction, in which the india rubber ring 32 is used, an internal cylinder 33 rests with its lower end upon the rubber ring 32, so that a downward movement of the cylinder 33 against the ring will cause it to be distorted in transverse section, forcing part of the ring inward radially against the flange on the cap and pressing it firmly against the bottle neck, and into locking engagement therewith, at the same time conforming to any irregularities in the bottle neck and causing the pressure to be equally exerted at all points.

Within the head and in such position that it is engaged by the top of the cap or retaining band, is a yielding or conformable member, which acts to exert an evenly distributed downward pressure on the cap. This downward presser is arranged so that it yields against the upward pressure of the bottle and cap conforming to any irregularities therein and is preferably formed of india rubber in the shape of a disk or ring. In the preferred construction illustrated in the drawings this presser consists of an india rubber ring 35 mounted upon the lower end of the cylindrical block 34, arranged within the cylinder 33 and projects downward beyond the face of the block. The ring 35 seats on a circumferential ledge in the block and is provided with a projecting ridge 36 engaging a groove in the block 34 to prevent it from becoming displaced. The preferable relative position of the rubber rings is such, that in inoperative position, the lower part of ring 35 lies within the ring 32.

The neck of the receptacle entering the head engages the cap and moves up with it against the ring 35, the upward pressure of the receptacle distorting the ring, conforming it to the shape of the cap and pressing the cap tightly against the top of the receptacle. The caps are preferably made of a yielding material which conforms to the shape of the top of the bottle when pressure is applied, and usually contain a packing ring or disk for tightly sealing the joint. When caps of a more rigid material are used the packing ring is distorted to conform to the top of the bottle and seal the joint. The conformable quality of the ring 35 causes the pressure to be evenly distributed over the top of the receptacle or the cover and prevents a concentration of the pressure at one point which would tend to break the receptacle. This feature is especially valuable when glass covers are applied to glass receptacles, as a concentration of the pressure in this instance due to any irregularities in the cover or the receptacle would frequently break either the cover or the receptacle.

The block 34 is attached to a cross bar 37 which passes through slots 38 in cylinder 33 and rests within the recesses 39 in the bracket 27 so that the cylinder 33 may be moved downward to compress the rubber ring 32 without interfering with the downward pressure on the bottle.

The head is also provided with a laterally arranged passage 41 for conveying the caps or retaining bands to proper position to engage the receptacle as it enters the head. The spring held dogs 42 arranged on opposite sides of the mouth of the head, hold the cap in position and are pressed back as the receptacle enters.

The inner cylinder 33 is moved downward to distort the rubber ring 32 by the levers 43 engaging the shank 44 thereof. The levers 43 are pivoted at one end to the lugs 45 on the bracket 27 and at the other end are adjustably attached to the rod 46. The levers are connected by a cross pin carrying a roller 47 which bears against the top of the shank 44 as the outer end of the lever is moved downward.

The rod 46 is provided at its lower end with stops or hooks spaced apart, so that the levers which operate the rod may have considerable play independent of the rod. The levers 48 are pivotally attached to the levers 12 by the pin 49 and are connected on their outer ends by the pin 51 which engages the rod 46 intermediate the stops or hooked portions. The distance between the stops or hooks is such that in the operation of the machine, the table is moved to the required height before the pin 51 engages the hook 52 to depress the levers 43 and distort the rubber ring 32.

The pressure on the rubber ring 32 is governed by the spring 53 interposed between the levers 12 and the levers 48. The spring 53 rests between a plate 85, secured to the lower edges of levers 48 and the head 86 of a bolt 87 which extends through said spring, plate between said levers and through a plate 88 secured to the upper edges of the levers 12, and is held in position by a nut 89 which screws on the upper end of the bolt against the plate. This spring allows the levers 48 to have a motion independent of the levers 12, so that when the pin 51 engages the hook 52 and sufficient pressure has been exerted on the rubber ring 32, the further movement of levers 12, due to the motion of the connecting rod 9, will compress the spring 53. This spring therefore acts as a cushion spring to prevent an excess pressure on the sides of the receptacles as the caps are being applied. It will, therefore be seen that this feature of the machine provides for a uniform and predetermined pressure through the medium of the ring 32, against the flange of the caps or retaining bands, for compressing the flange around the neck of the receptacle, notwithstanding variation in the diameter of receptacle necks which would otherwise affect the said pressure and occasion breakage in receptacles having necks of large diameter.

The caps, which are to be attached to the receptacles, are generally placed in the hopper 54 supported at the top of the machine. The frame 55 of the hopper is placed at an angle to accomplish the segregation and distribution of the caps. Arranged in the frame is a revoluble distributing plate 56, mounted on the shaft 57 provided with a pulley 58, on which operates the belt 59. This belt is driven from the main drive shaft through belt 61 and suitable pulleys.

The distributing plate 56 is provided at its circumference with a plurality of equally spaced lugs or keys 62, forming between each other a channel having parallel sides, and of a width slightly greater than that of the caps. The channels are formed with a curved bottom, to coincide with the curvature of the top of the cap. The channels are of such height that when the caps are properly seated therein, they do not project above the top of the keys. Should the cap engage the channel, with its top surface upward it could not properly seat on account of the curvature of the bottom of the channel and would project above the keys. From this position it is removed and pushed back into the hopper by the ejector finger 63.

Within the hopper is an agitating plate 64 which acts to continually turn the caps over so that a certain percentage will be in proper position to pass through the channels. The plate is supported in position above the distributing plate by brackets 65 attached to the plate and to the frame of the hopper. Parts of the plate 64 are bent downward to meet the face of the distributing plate so that as this plate rotates, the caps are forced up the inclined surfaces 66 on to the body of the plate from which they drop again to the distributing plate. This operation serves to turn the caps over and keeps a large number of them turned in the proper position to pass through the channels.

The hopper frame 55 is provided around the circumference with a standing edge 67, which at one part lies adjacent the edge of the distributing plate and at another part is spaced apart therefrom to form a channel 68 in which the caps are collected. The caps in the channel pass therefrom through the mouth 69 into the cap chute 71 which extends therefrom to the feeding passage 41 in the head 26. The chute 71 is arranged so that the caps are turned over during their travel to the head; that is, they emerge from the hopper upside down and enter the head in the correct position.

In order to insure the proper feeding of the caps to the head, the finger 72 has been arranged to advance the caps at every capping operation. The finger 72 is pivoted to the lever 73 which is pivoted to the frame of the machine and attached at its inner end to a moving part of the machine, such as the lever 43. The finger extends through a slot in the cap chute and is held against the caps by being overbalanced on the other side of its fulcrum. With each operation of the machine the finger moves up and engages the next cap and moves it downward a distance equal to the diameter of one cap. By means of this positive feed the caps are fed positively into the head.

The operation of the machine is as follows, assuming that a bottle and cap are to be used and the table is in approximately the correct adjustment: The bottle is placed on the table 15 and is positioned against the guide 21. The machine being thrown into operation by depressing the foot lever 6, the levers 12 are operated to raise the bottle. As the neck of the bottle enters the head 26 it engages the cap and is moved upward against the rubber ring 35 which causes the cap to seat firmly on the bottle. During this time the pin 51 has moved downward until it engages the hook 52 on the rod 46, and a further movement of the pin operates the levers 43, to compress the rubber ring 32 which expands diametrically and forces the flange of the cap into engagement with the neck of the bottle. After the cap had been firmly pressed against the rubber ring 35 the further movement of the levers 12, as far as the movement of the table is concerned, is taken up by the spring 25. During the first movement of the levers 12 they are fulcrumed on the pin 22, but during the latter movement they pivot about the connection with the links 13 as a fulcrum. When sufficient inward pressure has been applied to properly attach the cap, and the levers 12 are still moving downward, the spring 53 is compressed allowing the levers 12 to move without further advancing the pin 51 and thereby exerting an excess of pressure around the bottle neck. During these operations the cap feeding device has been operating and the finger 72 has been moved up and down to advance the caps in the chute 71 a distance equal to the diameter of one cap. By screwing the nut 80 toward the upper end of the rod 23, the spring 25 may be adjusted to yield so as to allow the table 15 to bring the top of the bottle cap against the ring 35 with only a slight pressure. By screwing the nut 80 down on said rod the spring may be adjusted so as to yield and limit the pressure of the top of the bottle cap against the ring 35 only when the table 15 has brought the top of the bottle cap against the ring 35 with considerable pressure. By turning the nut 89 so as to allow the bolt 87 to be extended from the plate 85 and the spring 53 to expand, the spring will yield and allow only a slight pressure to be applied to the ring 32 by the plunger 44. By turning the nut 89 so as to draw the head 86 of the bolt 87 toward the plate 85 and compress the spring 53, the spring will yield and limit the pressure of the plunger 44 upon the ring 32 only when considerable pressure has been applied by the plunger to the ring. The pressure against the top of the bottle cap and the pressure on the side flange of the cap may be adjusted independently by turning the nuts 80 and 89 respectively; or, the said top and side pressure may be adjusted together by turning the nuts 80 and 89 properly together.

I claim:

1. In an apparatus for sealing bottles and the like, a vertically movable table adapted to receive the bottle, a lever for moving said table, a head arranged above and in line with said table, a flexible ring in said head, a compressor operating to distort said ring to exert an inward pressure on the neck of the bottle, means in the head for limiting the upward movement of the bottle, a lever for operating said compressor, and means connecting said lever to the table operating lever arranged to actuate the compressor after the upward movement of the bottle has ceased, the lever operating the table being fulcrumed upon a yielding support.

2. In an apparatus for applying flanged caps to bottles and the like, a frame, a cap applying head arranged on said frame, a vertically reciprocable table arranged below said head, a lever connected at one end to said table and at the other end to operating mechanism, a vertically movable spring held pivot upon which said lever is fulcrumed, and means connecting said lever with the cap applying head.

3. In an apparatus for applying flanged caps to bottles and the like, a frame, a cap applying head arranged on said frame, a vertically reciprocable table arranged on said frame below said head, a lever arranged to reciprocate said table, and a connection between said lever and said head whereby said cap applying head is moved inwardly against the bottle cap for capping the bottle when the bottle and cap are brought into capping position by said table.

4. In an apparatus of the character disclosed, the combination of means for pressing the top of the bottle cap against the mouth of the bottle, a compressible ring, and yielding automatic means for compressing said ring against the flange of the cap, while the top of the cap is held on the mouth of the bottle, so as to press said flange against the neck of the bottle.

5. In an apparatus of the character disclosed, the combination of means for pressing the top of the bottle cap against the mouth of the bottle, a compressible ring and yielding means for compressing said ring against the flange of the cap, while the top of the cap is held against the mouth of the bottle, so as to press said flange firmly against the neck of the bottle.

6. In an apparatus of the character disclosed, the combination of means for pressing the top of the bottle cap against the mouth of the bottle, a compressible ring, a compressing element for engaging and compressing said ring to press the flange of the cap against the neck of the bottle, a lever, a second lever pivoted to said first lever, a spring interposed between said first lever and one end of said second lever, connections between the other end of said second lever and said compressing element, said first lever being adapted to operate said compressing element through said second lever and said connections, and said spring adapted to yield to prevent further compressing movement of said compressing element when said ring has been compressed to a predetermined degree.

7. In an apparatus of the character disclosed, a support for the bottle, a head in alinement with said support, a flexible member in said head for engaging the top of the bottle cap, a flexible ring in said head for engaging the flange of the bottle cap, a lever for moving said support, to bring the mouth of the bottle into said head and the top of said cap against said flexible member to hold the top of the cap against the mouth of the bottle, a compressor for engaging and compressing said flexible ring so that said ring will press the flange of the cap firmly against the neck of the bottle, a second lever pivoted to said first lever, a spring interposed between said first lever and one end of said second lever, connections between the other end of said second lever and said compressor, said first lever being adapted to operate said compressor through said second lever and connections and said spring being adapted to yield to prevent further compressing movement of said compressor when said flexible ring has been compressed to a predetermined degree.

8. In an apparatus for applying flanged sealing caps to bottles and the like, a reciprocable bottle support, a cap applying head in alinement with said support, power applying means, means connecting said power applying means and said support for reciprocating said support, means connecting said power applying means to said cap applying head to actuate said head, and a spring interposed between said support connecting means and said head connecting means adapted to prevent excessive power being applied to said cap applying head.

9. In an apparatus of the character disclosed, means for pressing the top of the bottle cap against the mouth of the bottle, an elastic element, means for pressing said element against the flange cap to press said flange firmly against the neck of the bottle, while the cap is pressed against the mouth of the bottle, a spring associated with said latter means adapted to yield to limit the pressure of said elastic element against said cap flange and means for adjusting the tension of said spring.

10. In an apparatus of the character disclosed, an elastic element, means for causing the top of the bottle cap to engage said elastic element, a spring associated with said means adapted to yield and limit the pressure of the top of said bottle cap against said elastic element, means for adjusting the tension of said spring, a second elastic element, means for pressing said second elastic element against the cap flange to press said flange firmly against the neck of the bottle, while the cap is pressed against the mouth of the bottle, a spring associated with said pressing means for said second elastic element, adapted to yield to limit the pressure of said elastic element against said cap flange and means for adjusting the tension of said spring.

11. In an apparatus for applying flanged caps to bottles and the like, a cap applying head, a reciprocatable table in alinement with said head, a cross piece, a rod extending reciprocatively mounted in said cross piece, a spring surrounding said rod and resting at one end against said cross piece, a nut screwing on said rod against the other end of said spring, a lever pivoted upon said rod and connected to said table, means connecting said lever to said cap applying head and means for actuating said lever.

12. In an apparatus of the character disclosed, a support for the bottle, a head in alinement with said support, a flexible member in said head for engaging the top of the bottle cap, a flexible ring in said head for engaging the flange of the bottle cap, a lever for moving said support, to bring the mouth of the bottle into said head and the top of said cap against said flexible member to hold the top of the cap against the mouth of the bottle, a compressor for engaging and compressing said flexible ring so that said ring will press the flange of the cap firmly against the neck of the bottle, a second lever pivoted to said first lever, a spring interposed between said first lever and one end of said second lever, connections between the other end of said second lever and said compressor said first lever being adapted to operate said compressor through said second lever and connections and said spring being adapted to yield to prevent further compressing movement of said compressor when said flexible ring has been compressed to a predetermined degree, and means for adjusting the tension of said spring.

13. In an apparatus of the character disclosed, a cap top engaging-element for holding the cap on the mouth of the bottle, yielding means for causing said cap top engaging element to engage the cap top with a definite pressure, means for adjusting said yielding means to vary the pressure of said element against the bottle cap top, a cap flange engaging element, yielding means for actuating said flange engaging element to press the cap flange against the neck of the bottle with a definite pressure, and means for adjusting said yielding means to vary the pressure of said flange engaging element against said cap flange.

14. In an apparatus of the character disclosed, a cap top engaging element for holding the cap on the mouth of the bottle, yielding means for causing said element to engage the top of the cap with a definite pressure, a cap flange engaging element, yielding means for actuating said flange engaging element to press the cap flange against the neck of the bottle with a definite pressure and independent adjusting means for respectively adjusting both of said yielding means to vary the pressure of said elements against the top and flange of the bottle cap respectively.

15. In an apparatus of the character disclosed, a cap top engaging element for holding the cap on the mouth of the bottle, automatic yielding means for causing said cap top engaging element to engage the cap top with a definite pressure, means for adjusting said yielding means to vary the pressure of said element against the bottle cap top, a cap flange engaging element, automatic yielding means for actuating said flange element to press the cap flange against the neck of the bottle with a definite pressure, and means for adjusting said yielding means to vary the pressure of said flange engaging element against said cap flange.

16. In an apparatus of the character disclosed, a cap top engaging element for holding the cap on the mouth of the bottle, automatic yielding means for causing said element to engage the top of the cap with a definite pressure, a cap flange engaging element, automatic yielding means for actuating said flange engaging element to press the cap flange against the neck of the bottle with a definite pressure and independent adjusting means for respectively adjusting both of said yielding means to vary the pressure of said elements against the top and flange of the bottle cap respectively.

17. In an apparatus of the character disclosed, a support for the bottle, a head in alinement with said support, a member in said head for engaging the top of the bottle cap, a ring in said head for engaging the flange of the bottle cap, a lever for moving said support, to bring the mouth of the bottle into said head and the top of said cap against said member to hold the top of the cap against the mouth of the bottle, a compressor for engaging and compressing said ring so that said ring will press the flange of the cap firmly against the neck of the bottle, a second lever pivoted to said first lever, a spring interposed between said first lever and one end of said second lever, connections between the other end of said second lever and said compressor, said first lever being adapted to operate said compressor through said second lever and connections and said spring being adapted to yield to prevent further compressing movement of said compressor when said ring has been compressed to a predetermined degree, and means for adjusting the tension of said spring.

In testimony whereof, I have hereunto set my hand at San Francisco, California, this 25th day of November 1911.

WILLIAM C. BUHLES.

In presence of—
H. G. PROST,
R. HEFFERNAN.